July 11, 1967 J. W. QUINN 3,330,091

BOX FOR CARRYING AND MIXING AGGREGATE MATERIALS

Filed July 15, 1964

INVENTOR.
JOHN W. QUINN

BY
Owen, Wickersham & Erickson
ATTYS.

United States Patent Office 3,330,091
Patented July 11, 1967

3,330,091
BOX FOR CARRYING AND MIXING AGGREGATE MATERIALS
John W. Quinn, 4635 Cristy Way, Castro Valley, Calif. 94546
Filed July 15, 1964, Ser. No. 382,716
1 Claim. (Cl. 53—29)

This invention relates to a disposable container for storing and mixing aggregate materials for concrete mortar and the like. It also relates to a novel method for loading such containers with all of the constituents necessary for concrete or other mixtures except water.

Homeowners frequently need relatively small amounts of concrete or mortar for minor construction projects such as fences, patios and the like. Heretofore the aggregate materials for such mixtures were available either in bulk form or in sacks containing all of the materials, including cement, mixed together. Bulk procurement is impractical where only small quantities are needed. A disadvantage of the premixed materials in sacks heretofore used, was that such mixtures had to be kiln-dried so as to prevent setting of the cement in storage. This requirement greatly increased the cost of such sacked mixtures.

Another problem entailed in using either materials from bulk stocks or sacks of kiln-dried premixed cement and aggregate was that an additional facility was needed within which to mix them with water. This required the use of either a mixer or some other container such a wheelbarrow. For small jobs, the home worker normally used the latter, and this meant that the sack had to be emptied into the wheelbarrow, and after the job was completed, the wheelbarrow had to be cleaned thoroughly.

One object of the present invention is to overcome the aforesaid problems by providing a disposable container capable of storing aggregate materials for concrete and the like that can also be used for mixing the materials with water on the job site.

Another object of the present invention is to provide a paperboard box or carton for storing air-dried aggregate materials which when opened, provides an open leakproof chamber of increased volume wherein water can be added to the aggregate materials as they are mixed.

Still another object of my invention is to provide a container for storing and then mixing aggregate materials with water that can be formed as a flat box blank with conventional means before being erected, and which is therefore well adapted for each and economy of manufacture.

A further important object of my invention is to provide a method for loading or storing aggregates in a container which eliminates the need for the aggregates to be kiln-dried.

Other objects, advantages and features of the invention will become apparent from the following detailed description presented with the accompanying drawings, in which.

Figure 1:
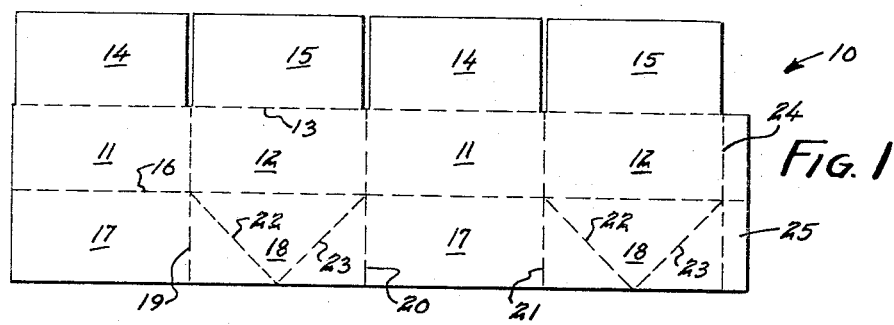
FIG. 1 is a plan view of the unfolded blank for a container embodying the principles of the invention.

Referring to the drawings, FIG. 1 shows a box blank for a container 10 embodying the principles of the invention. The blank can be made from any suitable paperboard material such as conventional corrugated kraft paper or board, and the weight of such paperboard material need not be greater than the standard weight used for shipping cases (e.g., 200-pound mullen). Generally, the blank is comprised of opposite pairs of side panels 11 and 12, and attached to these panels along a score line 13 are pairs of bottom flaps 14 and 15, all of which are separated by slots. Extending from a score line 16 that defines the upper edge of the panels 11 and 12 are pairs of top closure members 17 and 18, respectively. In accordance with the invention, the top members are not slotted but are interconnected by the parallel score lines 19, 20 and 21 which also separate the opposite side panels 11 and 12. Also, the opposite top closure members 18 are each provided with a pair of converging score lines 22 and 23 that extend from the inner corners of each outer top member 18 on the score line 16 and meet at the outer edge of the member 18 at a point that is half way between its ends. These score lines 22 and 23 are preferably reversed from the other score lines on the box blank so that the top members 18 will fold easily in the opposite direction. Integrally connected by a score line 24 to a side panel 12 and a top member 18 and extending the full length of these elements is a manufacturer's flap 25. This latter flap in connected to the end side panel 11 when the box is erected, either by stitching with staples or gluing in the conventional manner.

When the blank shown in FIG. 1 is erected to form the container 10 ready for filling, it is folded along the score lines 19, 20 and 21 in a rectangular tubular shape and the end flap 25 is also folded along the score line 24 before being stitched to both the side panel 11 and the unscored top flap 17. This unique ararngement is far different from the standard regular slotted carton wherein the top flaps are slotted as the bottom flaps are in the container 10.

Figure 6:
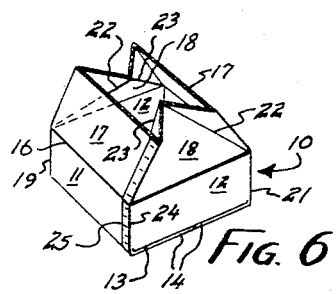
FIG. 6 is a view in perspective showing the top flaps of the container of FIGS. 1 to 5 in the partially open position.
Figures 3, 4:
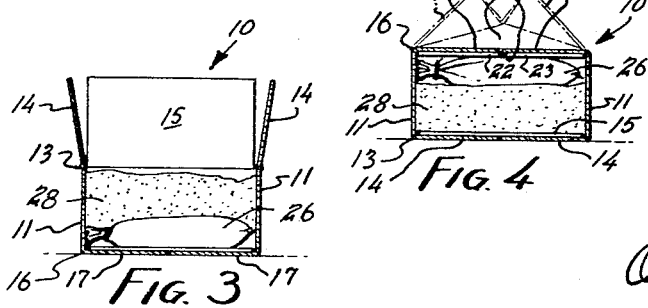
FIG. 3 is a view in elevation and in section showing a container according to the invention upside down with the bottom open just after being loaded with aggregate or cement material for storage or shipment.
FIG. 4 is a view in elevation and in section showing the container of FIG. 3 right side up as it appears ready to be opened for use.

I will now describe the method by which my container may be used for storing, shipping and subsequently for mixing with water, a combination of aggregate materials and cement. The first step of my method in using the container 10 is to fold the top closure members 18 along their score lines 22 and 23 and to bring the opposite panels 17 together, as shown in FIG. 6. Note that the stitch flap 25 is attached to an unscored top closure member 17 so that it in no way interferes with the folding and closing of the top flaps 17 and 18. These latter flaps 17 are then taped, glued or stitched to the folded members 18 to secure them in the closed position. The box 10 is then turned upside down with the slotted bottom flaps 14 and 15 uppermost in the open position. I now place in the bottom of the open container a small bag 26 containing cement material 27 of a predetermined amount. This bag 26 is moisture-proof and is preferably made from some suitable moisture resistant, transparent plastic, such as polyethylene. The open container 10 is now filled with a quantity of the desired type of aggregate which is desginated by the numeral 28 (FIG. 3). Because the cement material 27 is protected from moisture within its plastic bag 26, the aggregate materials 28 need not be kiln-dried as is the case with aggregate materials already mixed with cement heretofore available. The aggregate materials here need only be air-dried, thus eliminating an expensive process in the handling of this material. With the aggregate material 28 filled to the upper level of the side flaps 11 and 12, the slotted bottom flaps 14 and 15 are now closed and either glued, taped or stitched so that the container is ready for storage or shipment.

Figure 2:
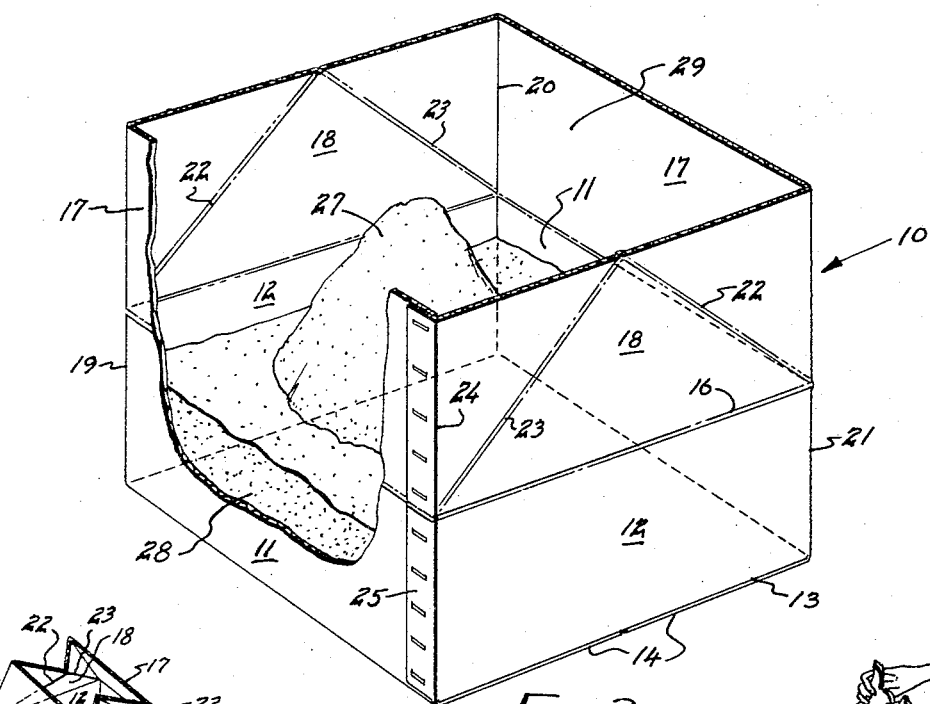
FIG. 2 is a view in perspective of a storage and mixing container according to the invention with the container open and a portion thereof broken away to show the aggregate and cement material before being mixed.
Figure 5:
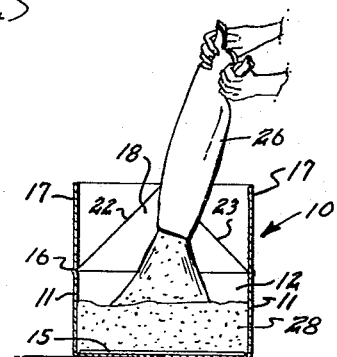
FIG. 5 is a view in elevation and in section showing the container of FIGS. 3 and 4 in the fully open position.

When my container 10 is ready for use, it is placed in the upright position and the upper scored flaps 18 are separated so that the container can be opened up with the upper flaps 17 and 18 forming an upwardly extending tubular portion (FIG. 4). Since these upper flaps are folded and not slotted, there is no opening for moisture to leak out and the combined height of the side flaps and the top flaps can now be used to form a mixing chamber 29 for the cement and aggregate mixing material (FIG. 2). The bag 26 of cement material 27 is available on the top of the aggregate when the top flaps are opened and this bag can now be broken open to disperse the cement within the aggregate (FIG. 5). The user can now conveniently add water to the mixture in the desired amount and mix the aggregate, cement and water together within the container before pouring it into his forms or other place of use. During the mixing of the aggregates and water, the box maintains its structural rigidity and strength even though a generous amount of water may be used. After the material has been mixed and removed from the container, the container can be disposed of by burning or any other method.

From the foregoing it should be apparent that the present invention provides a substantial advance in the art in that it eliminates the need to provide a separate mixing chamber from the means for storing the aggregate material. The over-all result is a more convenient procedure for handling aggregates in making small quantities of concrete and other mixtures, as well as one that is more economically efficient.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A method for storing a quantity of aggregate materials within a container so that they can be mixed together when the container is open, comprising the steps of:

providing a box blank having side wall panels, bottom flaps, top closure panels and a manufacturer's end flap;

erecting the container blank by attaching its manufacturer's end flap to form a tubular configuration;

folding the top closure members of the tubular container and securing them in the closed position;

arranging the container with the top closure members down and the bottom flaps open and facing upwardly;

placing a predetermined quantity of dried cement secured in a moisture-proof bag in the bottom of the open container;

filling the rest of the container on top of the moisture-proof bag with air-dried aggregate materials;

folding and securing the bottom flaps of the container into the closed position;

whereby when said container is to be opened it can be turned right side up so that the moisture-proof bag of cement is accessible and can be mixed with the aggregate materials while the top closure members of the container are extended to the upright position, to form a mixing chamber.

References Cited

UNITED STATES PATENTS

| | | | |
|---|---|---|---|
| 630,789 | 8/1899 | Wyman | 229—37 XR |
| 2,439,435 | 4/1948 | Richardson et al. | 229—37 |
| 2,926,777 | 3/1960 | Maguire | 229—37 XR |

GRANVILLE Y. CUSTER, JR., *Primary Examiner.*